Jan. 9, 1968     C. A. GROSSE     3,362,272

SHEARING APPARATUS

Filed April 21, 1966     2 Sheets-Sheet 1

INVENTOR
Carl A. Grosse
BY
Charles H. Redman
Atty.

Jan. 9, 1968 C. A. GROSSE 3,362,272
SHEARING APPARATUS
Filed April 21, 1966 2 Sheets-Sheet 2
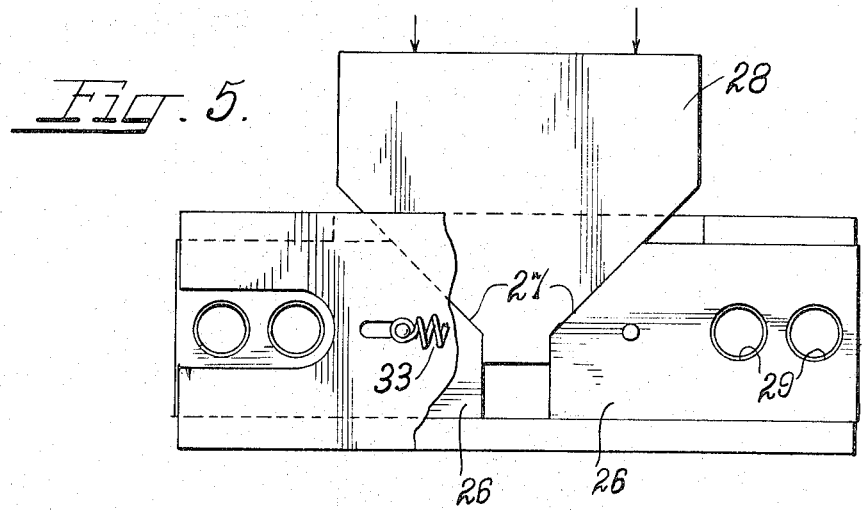
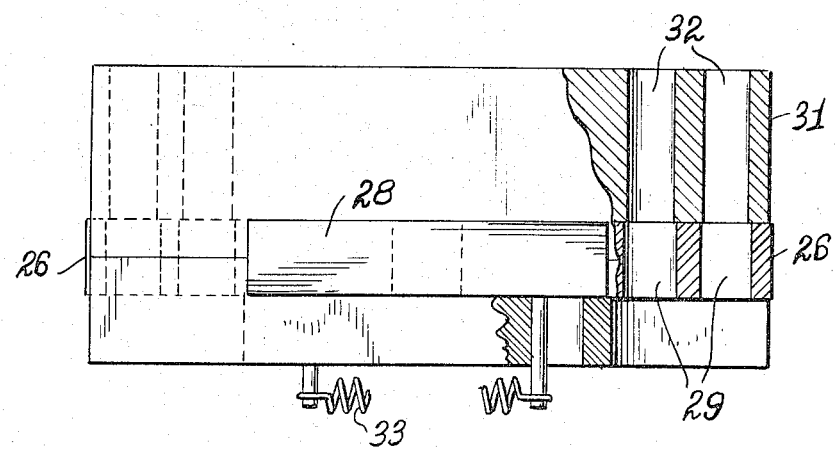
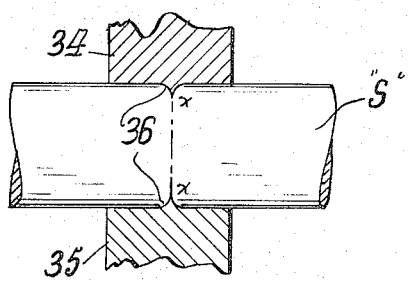
INVENTOR
Carl A. Grosse
BY
Charles H. Redman
Atty.

United States Patent Office 3,362,272
Patented Jan. 9, 1968

3,362,272
SHEARING APPARATUS
Carl A. Grosse, 624 N. Hamlin St.,
Chicago, Ill. 60624
Filed Apr. 21, 1966, Ser. No. 544,299
2 Claims. (Cl. 83—198)

ABSTRACT OF THE DISCLOSURE

Shearing apparatus including a fixed shearing block and movable shearing blocks, the latter being actuable by means of movable wedge means.

This application is a continuation-in-part of Ser. No. 395,805, filed Sept. 11, 1964, now abandoned.

This invention relates to improvements in shearing apparatus, and is more particularly concerned with the novel structure and assembly of apparatus adapted to shear bar, rod or tubular stock along one or more lines perpendicular to its axis.

More specifically, the apparatus of the present invention is adapted to be used in association with a heavy duty press and functions under load pressure to perform a clean, burr free cut that is perpendicular to the axis of the stock. The severed ends require no truing and the severed piece or pieces of stock is of exacting dimensions.

It is, therefore, an object of the invention to provide shearing apparatus of novel construction and assembly.

Another object is to provide a novel shearing tool for performing burr free cuts perpendicular to the axis of a length of stock.

Another object is to provide shearing apparatus of the character referred to that is not expensive or difficult to manufacture, may be set up easily and quickly, and which is very simple and accurate in its operation and highly efficient in use.

The structure and means by which the above noted and other advantages and objects of the invention are attained will be described in the following specification, taken in conjunction with the accompanying drawings, showing preferred illustrative embodiments of the invention, in which:

FIG. 5 is a front elevational view of a modified form of shearing apparatus, partly broken away;

FIG. 6 is a plan view of FIG. 5 apparatus, partly broken away; and,

FIG. 7 is a detail view of a length of rod stock being formed into bearings.

Figure 1:
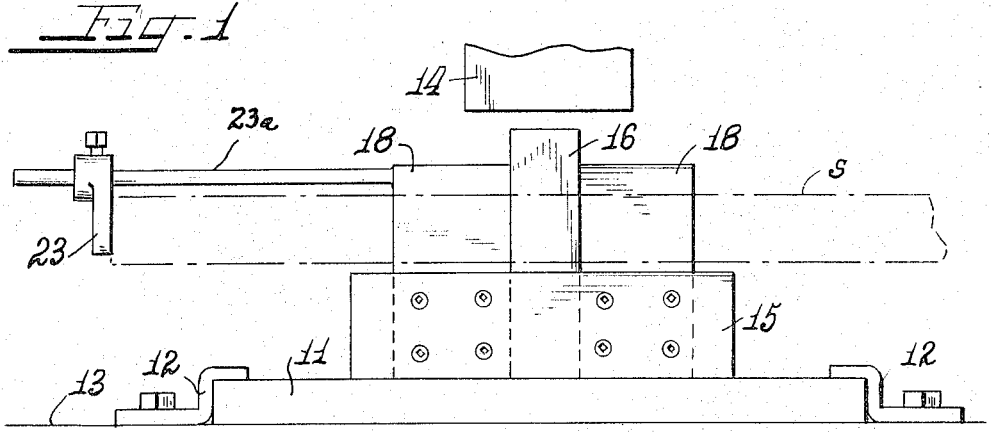
FIG. 1 is a side elevational view of one embodiment of the shearing apparatus, mounted in a press.
Figure 2:
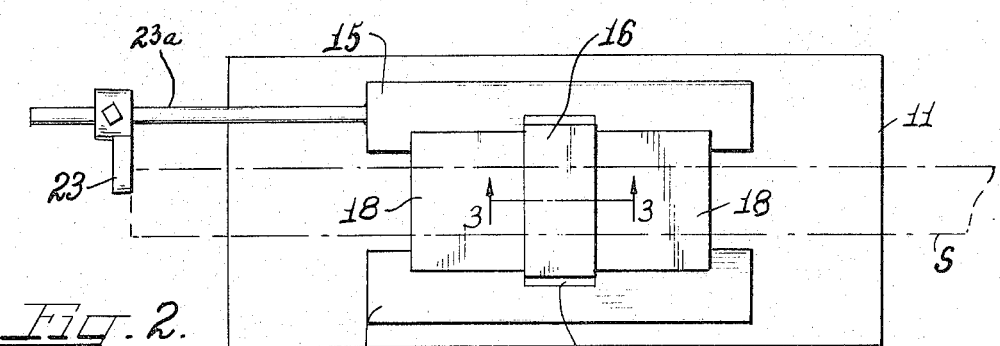
FIG. 2 is a top plan view of the shearing apparatus.
Figure 3:
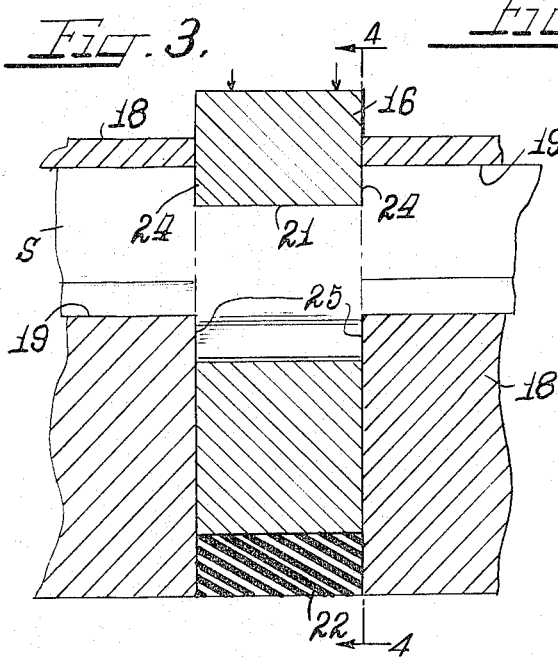
FIG. 3 is an enlarged longitudinal sectional view, taken substantially along line 3—3 of FIG. 2, showing the shearing block partially depressed.
Figure 4:
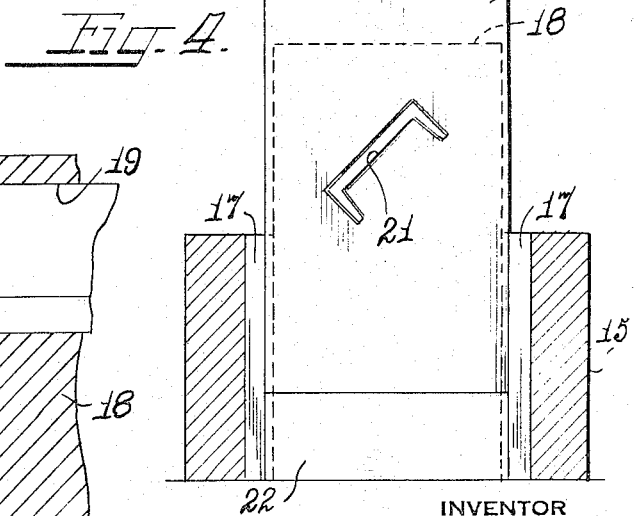
FIG. 4 is a transverse view of the shearing block assembly, as viewed along line 4—4 of FIG. 3.

Referring to the exemplary embodiment of the invention illustrated in FIGS. 1 to 4, the apparatus includes a heavy base plate 11 that is adapted to be seated on and suitably secured, as by clamps 12, to the bed 13 of a heavy duty press, beneath its ram 14.

Mounted rigidly on the base plate 11 is a pair of laterally spaced upstanding guides 15 between which is mounted a vertically reciprocable shearing block 16. The shearing block 16 comprises a heavy rectangular mass of steel or the like, guided in hardened steel shims 17 in said guide 15. Also arranged on the base plate 11, one on each side of but in longitudinal alignment with shearing block 16, are stock receiving guide blocks 18 that are arranged between and securely attached to guides 15 and/or base plate 11.

The opposed faces of the shearing block 16 have a snug sliding contact at all times with the opposed faces of the guide blocks 18. The guide blocks 18 each have an opening 19 therein of a size and shape to slidably receive a length of stock "S" to be sheared. This opening may be of any required shape to receive round stock, T-bars, L-beams, I-beams, and square, oblong or tubular stock, etc. In the disclosure, the openings 19 are channel shaped to receive a piece of channel shaped stock. The shearing block 16 also has a similar shaped opening 21 therein of a size and shape to receive the stock therethrough freely when the shear block is in the elevated position shown in FIGS. 1 and 4. Various means and devices may be employed to normally hold the shear block elevated. In the present disclosure a mass of resiliently compressible material 22, such as rubber or the like, is placed beneath the shear block 16. However, the elevating means may be a spring, piston and cylinder, or other equivalent to return the shear block to its original or normal elevated position.

In operation, the shearing apparatus is placed on the press beneath ram 14 and a length of stock "S" is thrust through the aligned openings 19, 21, in the guide blocks and shearing block respectively, and brought to a stop against an adjustable stop 23 carried on a rod 23a extending from the assembly. The position of stop 23 determines the length of one piece of stock to be sheared. The width of the shearing block 16 determines the length of a second piece of stock to be sheared. The press is now operated to drive the shear block 16 downwardly. This effectively shears the stock simultaneously at opposite sides, i.e., at 24 and 25 shown in FIG. 3. When the ram is fully depressed the stock is sheared. It is to be observed that because of this dual shearing on diametrically opposed faces of the stock, the shear block need be advanced downwardly a distance of one-half or less of the thickness of the stock being sheared. In the present disclosure of a piece of channel stock, the channel preferably is set at an angle, as shown, to relieve shearing stress. Further, owing to the dual shearing action there is no burr formed on the cut edges of the stock hence its sheared faces are true and require no finishing.

In FIGS. 5 and 6 disclosure, a modified shearing die mechanism embodying the principle of the one described hereinabove is disclosed. As shown, the mechanism comprises a pair of shearing dies 26 each formed with a cam edge 27 to be acted upon by a wedge-shaped pressure shoe 28 for driving the shearing dies outwardly in a horizontal direction. This structure affords means to shear two or more pieces of stock upon each operation. As shown, each shear die 26 has two stock receiving openings 29 (here shown round) and the rigid base structure or shear block 31 includes a like number of openings 32. When the pressure shoe 28 is withdrawn upwardly after a shearing operation, a spring 33 returns the shear dies to their original positions. The method of shearing is the same as described hereinabove except that it is done in a lateral direction.

In the event that rollers for roller bearings are to be formed, which preferably have rounded edges, round stock "S" can be initially formed in a press by means of dies 34–35 (FIG. 7) so as to form a circumferential groove 36 therein. The grooved stock is then placed in either shearing device illustrated and sheared along line x—x. This method of forming and shearing requires no finishing steps inasmuch as the end edges of the roller formed are already rounded as required and are true.

Although I have described preferred embodiment of my invention, it will be understood that the description thereof is intended to be illustrative, rather than restrictive, as details of the structure disclosed may be modified or changed without departing from the spirit or scope of the invention. Accordingly, I do not desire to be restricted to the exact construction disclosed and described.

I claim:

1. A shearing device comprising, in combination, a fixed shearing block having spaced openings therein through each of which a length of stock is extended, a pair of movable shearing blocks each having an opening normally aligned one with each of the first named openings and through which the stock is extended, said movable shearing blocks having surface engagement with the fixed shearing block, wedge means arranged between said movable shearing blocks operable to move said movable shearing blocks relative to the fixed shearing block to shear the stock in areas of opposed end edges of the aligned openings.

2. The shearing device recited in claim 1, in which means is provided to return the movable shearing blocks to their initial position when the wedge means is withdrawn from between them.

References Cited

UNITED STATES PATENTS

| | | | |
|---|---|---|---|
| 438,252 | 10/1890 | Koehler | 83—618 X |
| 1,309,848 | 7/1919 | Gabriel | 83—198 |
| 1,366,063 | 1/1921 | Culhane | 83—51 X |
| 1,438,888 | 12/1922 | Barton | 83—580 X |
| 3,245,296 | 4/1966 | Valente | 83—694 X |

FOREIGN PATENTS 634,708   9/1936   Germany.

ANDREW R. JUHASZ, *Primary Examiner.*